United States Patent
Deshpande

(10) Patent No.: US 10,042,957 B2
(45) Date of Patent: Aug. 7, 2018

(54) DEVICES AND METHODS FOR IMPLEMENTING DYNAMIC COLLABORATIVE WORKFLOW SYSTEMS

(71) Applicant: INNOVATIONDOCK, INC., Camarillo, CA (US)

(72) Inventor: Rajendra V. Deshpande, Camarillo, CA (US)

(73) Assignee: INNOVATIONDOCK, INC., Camarillo, CA (US)

( * ) Notice: Subject to any disclaimer, the term of this patent is extended or adjusted under 35 U.S.C. 154(b) by 0 days.

(21) Appl. No.: 15/405,277

(22) Filed: Jan. 12, 2017

(65) Prior Publication Data
US 2018/0196886 A1 Jul. 12, 2018

(51) Int. Cl.
*G06F 17/30* (2006.01)

(52) U.S. Cl.
CPC .. *G06F 17/30946* (2013.01); *G06F 17/30964* (2013.01)

(58) Field of Classification Search
CPC ......... G06F 17/30011; G06F 17/30879; G06F 17/30867; G06F 17/2097; G06F 17/30; G06F 9/52; G06F 17/30948; G06F 17/30964; G06Q 10/06
See application file for complete search history.

(56) References Cited

U.S. PATENT DOCUMENTS

| 8,117,131 | B2 | 2/2012 | Boozer |
| 8,620,918 | B1 | 12/2013 | Ben-Artzi et al. |
| 2005/0014901 | A1 | 1/2005 | Osae et al. |
| 2010/0131459 | A1 | 5/2010 | Todaka |
| 2010/0299184 | A1 | 11/2010 | Bishop et al. |
| 2013/0005974 | A1 | 1/2013 | Venkatraman et al. |
| 2013/0204864 | A1* | 8/2013 | Matsuo .................. G06Q 30/02 707/722 |
| 2014/0019187 | A1* | 1/2014 | Olsen ............... G06Q 10/06313 705/7.23 |

OTHER PUBLICATIONS

International Search Report for U.S. Appl. No. PCT/US17/13269 dated Apr. 4, 2017.

* cited by examiner

*Primary Examiner* — Scott A. Waldron
*Assistant Examiner* — Fatima P Mina
(74) *Attorney, Agent, or Firm* — Brooks Acordia IP Law, PC; Pejman Yedidsion

(57) ABSTRACT

Systems, devices, and methods for executing workflow instances of management of continuously changing data and queries. In one embodiment, a computing device may be configured to determine a set of related structured data comprising a key and associated value, where an associated ID and name for each related structured data of the set of related structured data may be determined. Additionally, a unique ID may be determined based on the determined associated ID and name. A match may then be determined for the set of core data elements based on a received message and an ordered list of results retrieved based on at least one of: the matched ID, the matched name, and the matched ID and name.

20 Claims, 6 Drawing Sheets

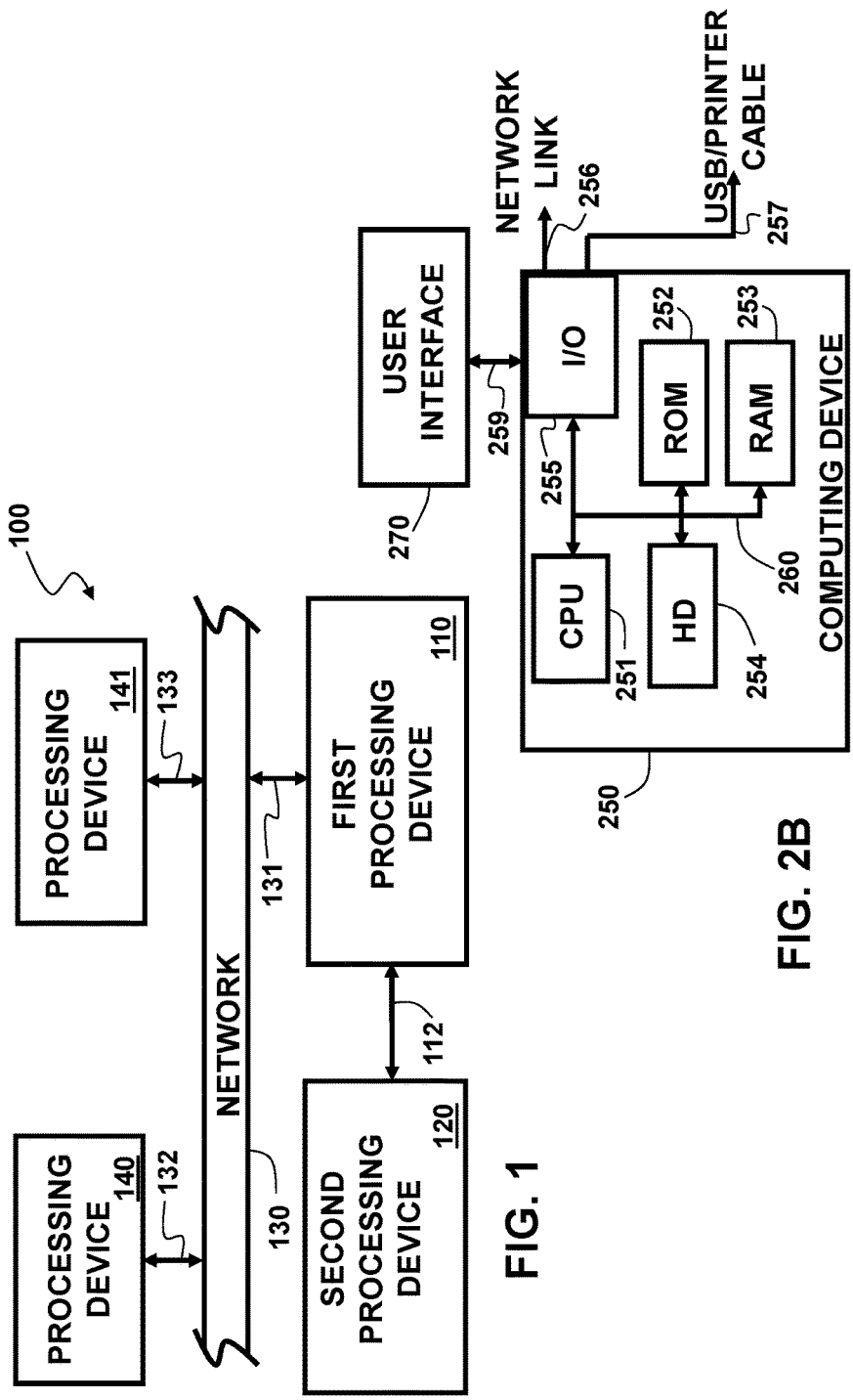

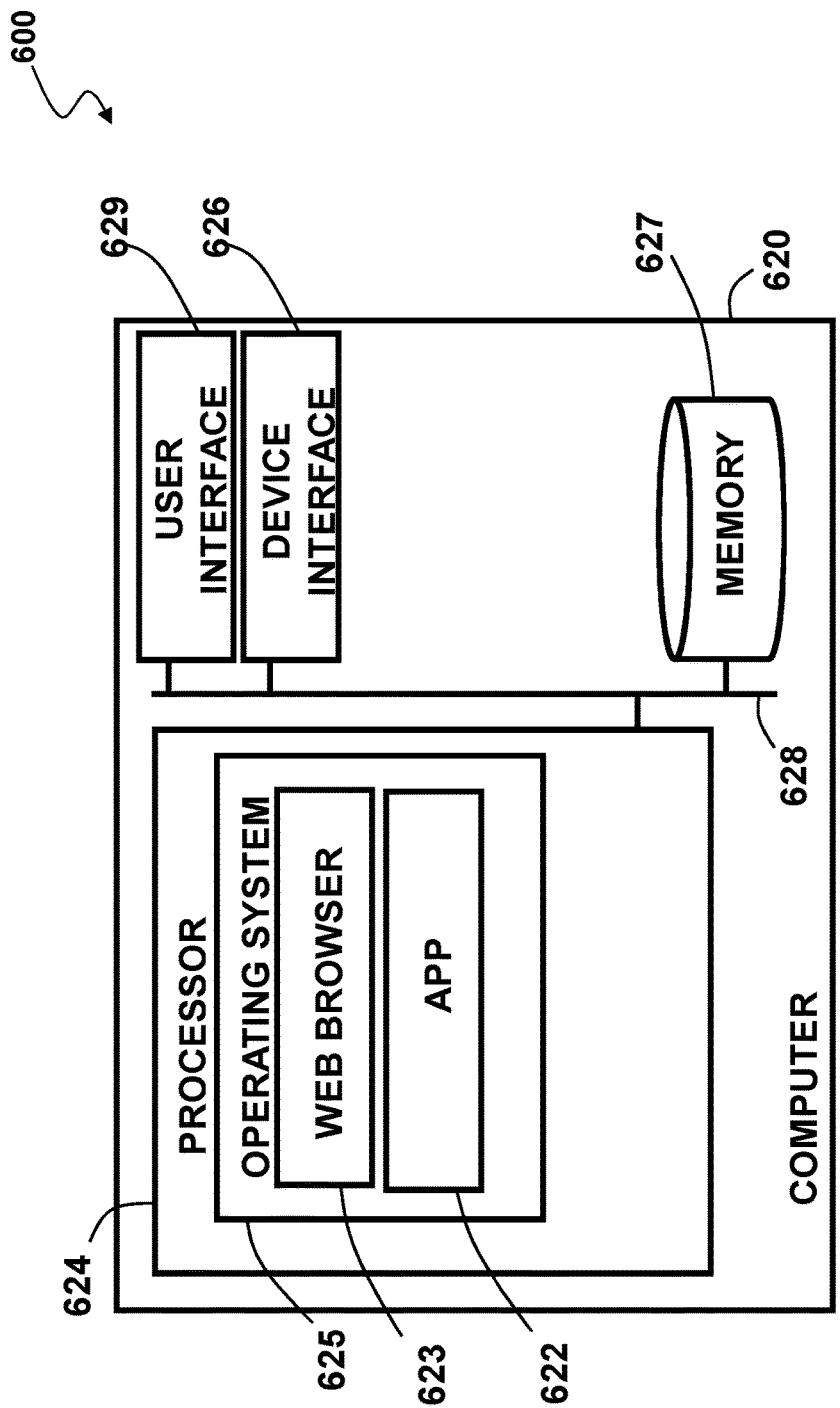

DEVICES AND METHODS FOR IMPLEMENTING DYNAMIC COLLABORATIVE WORKFLOW SYSTEMS

FIELD OF ENDEAVOR

The present invention, in its several embodiments, relates to devices, methods and systems for efficiently indexing workflow activities and on-demand search/match activities, and more particularly pertains to indexing and retrieving data within workflow activities.

BACKGROUND

Currently, workflow activity and data retrieval are hampered by extensive database usage. Data pertaining to, for example, innovation collaboration, require multiple database calls and hence use high processing power on a processor. In workflow type applications that have multiple stages, or data points, it is common that a particular processing stage of the workflow depends on data that have been produced and may or may not have been properly indexed. Workflow applications, or workflow instances, typically require that data be passed from one stage, step, or activity, to another in a sequential manner, requiring a linkage for passing the data and heavily depending on database calls.

SUMMARY

The invention, in its several embodiments, includes machine-enabled methods of, and devices and systems for workflow instance execution, particularly workflow instance execution that may include receiving a set of data attributes, determining a corresponding search indexing logic, and returning a resulting template.

Exemplary computing device embodiments may comprise: a processing unit and addressable memory; the processing unit configured to: execute workflow instances of management of continuously changing data and queries based on receiving a set of core data elements; determine, by an index controller of the computing device, a set of related structured data comprising a key and associated value based on the received set of core data elements; determine, by a search logic controller of the computing device, an associated ID and name for each related structured data of the set of related structured data; determine, by the search logic controller of the computing device, a unique ID based on the determined associated ID and name for each related structured data of the set of related structured data; match, by the match controller of the computing device, the set of core data elements with the determined unique ID based on receiving a message from the search logic controller of an update to the unique ID for the determined associated ID and name; and retrieve, by the ordered result determiner of the computing device in response to a received query, an ordered list of results based on at least one of: a matched ID, a matched name, and a matched ID and name. Optionally, the unique ID may further be based on a combination of the associated ID and name.

In another embodiment, the device may further be configured to: output, by an output controller of the computing device, the determined ordered list of results. In addition, the device may be further configured to: correct any query errors in the determined ordered list of results, based on checking the unique ID against the associated ID and name. In one embodiment, the device may be further configured to: modify, by the search logic controller of the computing device, the set of core data elements based on receiving a message from at least one of: index controller and the match controller, the message comprising information about a change in the determined associated ID and name.

In one exemplary embodiment, all of or at least a portion of the set of core data elements may be stored on a second computing device having a processor and memory, where the two computing devices may be in communication with each other via a network link. Additionally, the determined unique ID may be stored in the addressable memory, where the computing device may further comprise a data store, and further where the associated ID is stored in the addressable memory and the name is stored in the data store. Optionally, the device may, via parallel processing by the computing device execute the index controller, the search logic controller, the match controller, and the ordered result determiner independently and simultaneously.

Method embodiments may comprise: receiving, by a computing device comprising: a processing unit and addressable memory, a set of core data elements; determining, by an index controller of the computing device, a set of related structured data comprising a key and associated value based on the received set of core data elements; determining, by a search logic controller of the computing device, an associated ID and name for each related structured data of the set of related structured data; determining, by the search logic controller of the computing device, a unique ID based on the determined associated ID and name for each related structured data of the set of related structured data; matching, by the match controller of the computing device, the set of core data elements with the determined unique ID based on receiving a message from the search logic controller of an update to the unique ID for the determined associated ID and name; and retrieving, by the ordered result determiner of the computing device in response to a received query, an ordered list of results based on at least one of: the matched ID, the matched name, and the matched ID and name. Optionally, the unique ID may further be based on a combination of the associated ID and name.

The method embodiments may further comprise: outputting, by an output controller of the computing device, the determined ordered list of results. In addition, the method embodiment may further comprise: correcting, by the computing device, any query errors in the determined ordered list of results, based on checking the unique ID against the associated ID and name. In one embodiment, the method may further comprise: modifying, by the search logic controller of the computing device, the set of core data elements based on receiving a message from at least one of: index controller and the match controller, the message comprising information about a change in the determined associated ID and name. Optionally, all of or at least a portion of the set of core data elements may be stored on a second computing device having a processor and memory, where the two computing devices may be in communication with each other via a network link.

Additionally, the determined unique ID may be stored in the addressable memory. In an embodiment where the computing device may further comprise a data store, the associated ID may be stored in the addressable memory and the name may be stored in the data store. Optionally, in one embodiment, the index controller, the search logic controller, the match controller, and the ordered result determiner may be executed independently and simultaneously, via parallel processing by the computing device.

BRIEF DESCRIPTION OF THE DRAWINGS

Embodiments of the present invention are illustrated by way of example and not limitation in the figures of the accompanying drawings, and in which:

FIG. 1 illustrates an exemplary system embodiment of the dynamic collaborative workflow system where a first processing device may be in direct communication with a second processing device;

FIG. 2B illustrates a top level functional block diagram of an exemplary computing device that may execute embodiments of the dynamic collaborative workflow system;

FIG. 6 illustrates an exemplary top level functional block diagram of a computing device embodiment.

DETAILED DESCRIPTION

Figure 2A:
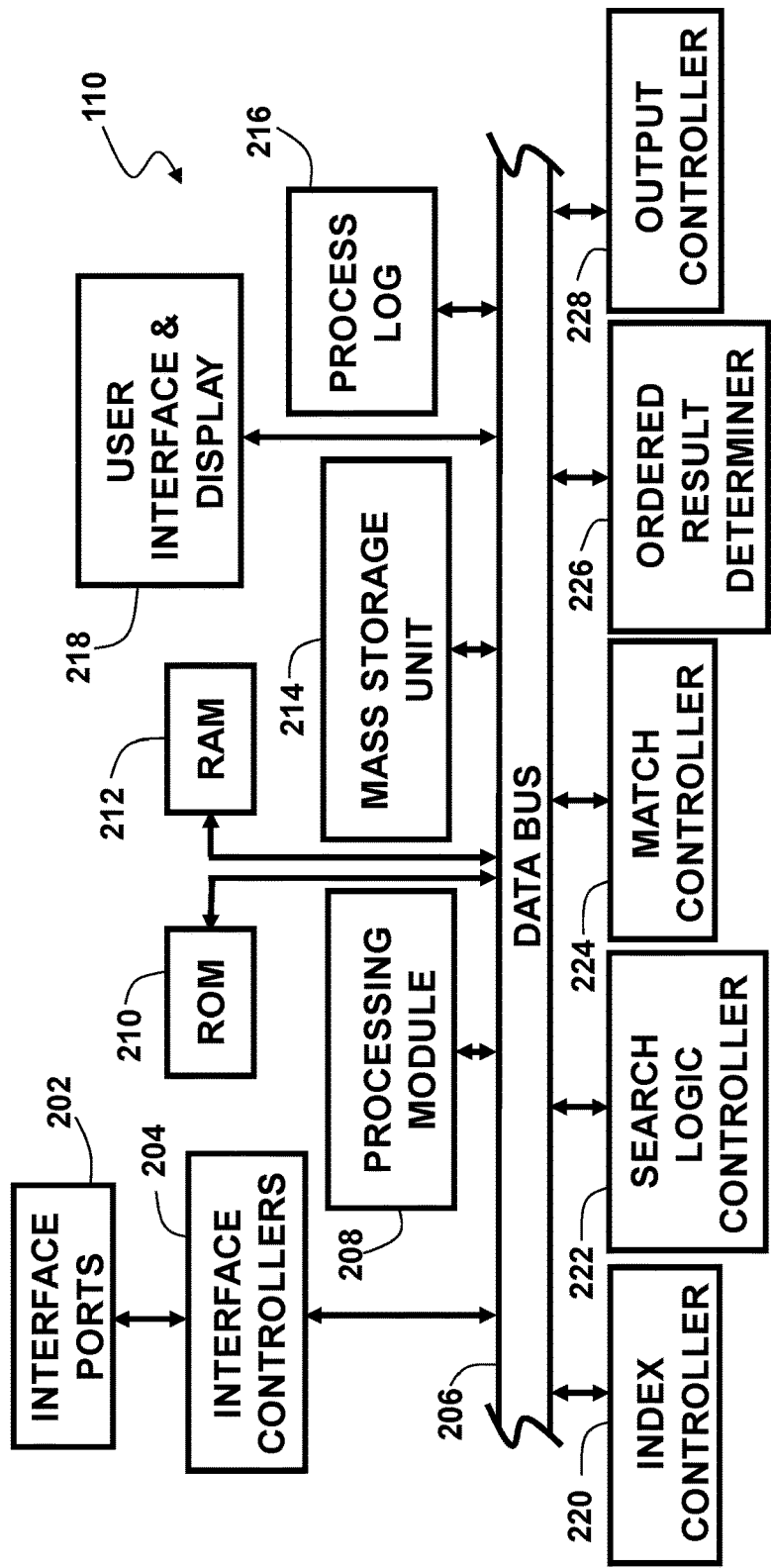
FIG. 2A illustrates a top level functional block diagram of an exemplary dynamic collaborative workflow system device.

An exemplary embodiment of a dynamic collaborative workflow system is disclosed where the system may provide a central and dynamically updating database of attributes, indexed under predetermined/determined/or defined metadata that organize, retrieve, and output content-rich-synopses at improved processing speeds. Embodiments of the dynamic collaborative workflow system may utilize efficient indexing by creating tables or indices that point to the location of a set of records. Depending on the purpose, indexing identifies the location of resources based on a set of criteria, for example, key data fields in the database record, previously positioned so as to efficiently return results with minimum processing usage. Database indices may be used to rapidly locate data without having to search every record in a database table every time a database table is accessed. Accordingly, the present embodiment, may facilitate the efficient and dynamic creation of indices within a workflow for on-demand searching and matching by a computing device that may dynamically, i.e., in real-time or near real-time, update a database table, providing the basis for both rapid random lookups and efficient access of ordered records.

Indexing metadata by a computing device may be used to facilitate efficient matching and indicate origins of a set of received information. Accordingly, a set of records may be searched and matched by the system, where the set of records may include: (a) a set of received attributes—either via an electronic document or document file generated or directly entered into the system; (b) a set of ordered attributes—an electronic record or document file generated by an application of an indexing logic. A designation of unique names may be utilized as a name uniquely applied to a particular attribute from which an index is generated, and subsequently used by the computing device to reduce processing time and power.

In one embodiment, the dynamic collaborative workflow system may implement a scheme for receiving a set of records as core data elements, where the core data elements may comprise a document and corresponding metadata associated with the one or more documents. The set of records may be received as a set of fragmented data records or prepackaged as one continuous series of data records, where the data records may be physically stored in a data store and on a hard drive as patterned bits to store the information. Thereafter, the system may, via an index controller, determine a set of indexed related structured data associated with each set of records, i.e., core data elements, and store the set of indexed related structured data, e.g., data fragments, via an indexing mechanism. In one embodiment, the determining of the set of indexed related structured data may be based on a combination of a key and an associated value. Additionally, for each record, having a combination of key and associated value, a unique ID may be determined and the determined unique ID may be stored and associated with the data record. That is, a set of indexed related structured data may be determined where each structured data point may comprise an ID and name, related to the data elements with a unique ID derived from the ID and name—e.g., based on a combination of the ID and name. Accordingly, the system may determine an ID associated with the entry, and a combination of the ID and name may create a unique ID for each record or structured data point.

Embodiments of the dynamic collaborative workflow system may comprise an index controller, a search logic controller, a match controller, an ordered result determiner, and an output controller. The processing devices described herein, may be embodied as computing devices, where the computing devices may comprise a processor with access to a data store and addressable memory, where an index controller may receive a set of records as core data elements and determine a related set of structured data comprising a key and associated value. Subsequently, the index controller may perform an indexing function where the determined related structured data may be indexed and stored in the data store. In one embodiment, either the index controller or the search logic controller my assign an associated ID to the related structured data, where the assigning of the associated ID may be based on a match of certain key terms or values.

The search logic controller may then determine an associated ID and name for each related structured data, where the associated ID and name may then be merged into a unique ID combination of the associated ID and name. For example, the workflow may comprise a core data element name that was entered by a user, followed by an associated ID assigned by the computing device based on an indexing search performed by the index controller. In one embodiment, the associated ID may be stored in the addressable memory while the core data element name may be stored in the data store. Alternatively, the determined unique ID may be stored in the addressable memory while the associated ID and name may be stored in the data store. According to these schemes, the unique ID or the associated ID being stored in the addressable memory facilitates the expedited lookup and eliminates a need for any preprocess data binding. In one embodiment, since accessing and retrieving data from an addressable memory may be an order of a magnitude faster than accessing the same from a data store stored on the hard drive, the search logic controller may update the ID in the addressable memory on a continual basis and then only access the data store with a search query once all the core data elements are determined.

Additionally, by way of assigning a unique ID to an associated ID and name, the computing device may only need to search records that are ordered and related to a specific ID. That is, only once the associated ID is matched for a unique ID, then the name records are searched for matching terms. In other words, by deriving a unique ID from a search query using an associated ID list, a search on the name terms may not necessarily be performed unless the associated ID is first match. Further, the matching of the ID may eliminate the number of records—that do not have the same ID—from being searched under the term matching search.

Data binding may be defined as the process for establishing a connection between two different data objects, for example, core data elements within a workflow or different workflows. Accordingly, dynamically created and updated unique ID may replace the need for data binding, and may instead bind together data sources from a provider and requester, and synchronize them during execution time, e.g., insertion or query, of the data according to the disclosed embodiment of the dynamic collaborative workflow system.

In one exemplary embodiment, the search logic controller may also implement a set of rules on each received core data element before moving the process along to the matching controller. Exemplary rules may be embodied as the following: must be active; must not be flagged; the first part of each search (term) must be present in at least one section; all offerings must match; all development stages must match; all submissions must match; all statuses must match; all objectives being sought much match.

The match controller may be running in parallel with the other controllers, i.e., index controller, search logic controller, and output controller, via conducting simultaneous processing. In this embodiment, the match controller may be performing the task of ensuring all core data elements are assigned a unique ID and updated in real-time with any changes coming from the user. Accordingly, the match controller may cause the computing device to execute an efficient workflow based on updating the unique ID upon any modifications to the records or requests for any records, achieving an on-demand and dynamically updating searching and matching of core data elements within the same workflow or across different workflows. Embodiments disclose methods of dynamic collaborative workflow system where no prior knowledge of workflow core data elements is needed.

In one embodiment, upon receipt of a search query, an ordered result determiner may communicate with the match controller and retrieve data records based on the simultaneous and independent management of continuously changing data and queries. That is, the ordered result determiner may not need to search all associated IDs or all names, or all associated IDs and names of all core data elements for a workflow execution. Instead, the ordered result determiner may merely retrieve a unique ID, determined by the search logic controller based on the associated ID and name, to instantly, i.e., with a minimum number of database calls, retrieve the requested record. That is, if not for the search logic controller, a query would require, at minimum, three database calls in order to search entire tables of records; however, with the match controller updating the records with any changes and the search logic controller assigning a unique ID, the call to the database is reduced to one call covering both the associated ID and name to be searched.

In the exemplary embodiment, the determined associated ID and name may be stored and accessed by a later stage, or another, workflow execution. The storing of both the associated ID and name of the core data element may, additionally, provide flexibility for the search logic controller to execute a query by looking up either the associated ID via exact matching, or the name by way of matching some or all of the terms in the name. In one embodiment, the ordered result determiner may execute a query, where based on the query and dynamically updating set of related structured data—if the binding comprises the correct settings and the data provided the proper associated ID—the queried results reflect the changes automatically, upon any changes to the data or its value. Accordingly, the query may be based on at least one of: the matched ID, the matched name, and the matched ID and name.

As the results are retrieved, an output controller may display the results in real-time, updating as the user is selecting any of the search criteria or fields and/or entering any text-based search terms. The output controller may be in direct communication with the ordered result determiner so that soon as the ordered results are retrieved, the output controller may display them.

FIG. 1 illustrates an exemplary system embodiment 100 of the dynamic collaborative workflow system where a first processing device 110 may be in direct communication 112 with a second processing device 120, such as a computer hosting one or more applications and/or rule sets. In addition, via a network 130 and a network link 131-133, the first device 110 may be in communication with one or more external processing devices 140, 141, such as one or more computers that may each facilitate the indexing and retrieving data within workflow activities, but across a network of computers. Hence, by utilizing a number of processors for performing operations, controlling, and executing commands, from different processing devices, the overall system may execute such indexing and retrieval of data within workflow activities more efficiently as compared with a single processor making database lookup queries and or multiple processors making database lookup queries.

The exemplary first processing device 110 of FIG. 1 may be illustrated in greater exemplary functional detail in FIG. 2A. Interface ports 202 may be present to connect to a network link, or an external wireless module. The interface ports 202 may be serviced by one or more interface controllers 204 that function to direct communications and/or condition signals between the respective interface port 202 and one or more modules of the first processing device 110 which may be in common communication via a data bus 206. The first processing device 110 may include one or more processing modules 208 that may draw data from read-only memory (ROM) 210 and exchange data with random access memory (RAM) 212 and may store files having sizes greater than the RAM 212 capacity in one or more mass storage units 214. The first processing device 110 may maintain a log of its processes 216 and have a user display and interface 218. The process log 216 may be a separate module or distributed, for example, with a portion executed via the processing module 208 that may access parameters, files, and/or indices that may be stored in ROM 210, RAM 212, a mass storage unit 214 or in combination thereof.

The first processing device 110 may include as individual or separate controllers, an index controller 220, a search logic controller 222, a match controller 224, an ordered result determiner 226, and an output controller 228, where each may be in direct communications with each other and/or condition signals with or between the processing module 208, for example, via the data bus 206. The exemplary first processing device 110 may store an indexed table in ROM 210, RAM 212, a mass storage unit 214 or in combination thereof and accordingly, the indexed table may be accessed by the output controller 226 and/or a processing module 208 and made available to devices external to the first processing device 110 via one or more interface ports 202. The exemplary first processing device 110 may have notice, for example, due to a user input via the user interface 218 or sensed by a sensor of incoming data, of any changes which may then be automatically reflected in the indexed table.

FIG. 2B illustrates a top level functional block diagram of a processing device that is an exemplary computing device 250 that may, via an input/output interface 255, interface 259 with the exemplary first processing device of FIG. 2A via a wireless or wired network link 256 or a parallel, serial, or universal serial bus (USB) cable 257. The user interface 270 may include tactile input via keyboard, mouse and/or touch screen and/or audio input via a microphone. The user interface 270 may provide output to the user via a display, e.g. a graphical user interface (GUI), and/or provide audio output to the user via one or more speakers, headphones or ear buds. The computing device 250 may further comprise a central processing unit (CPU) 251, read only memory (ROM) 252, random access memory (RAM) 253 and a mass storage unit 254, such as a hard disk drive. Two or more elements of the host computer 250 may be in communication via a data bus 260. The general accessing of data, processing of data and communication and display of data may be handled at the CPU level of the computing device 250 by an operating system.

A process embodiment of the dynamic collaborative workflow system may comprise the steps of (and not necessarily in the order of): (a) receiving a set of core data elements; (b) determining a set of related structured data; (c) determining a unique ID based an associated ID and name; (d) matching the set of core data elements based on at least one of: the matched ID, the matched name, and the matched ID and name; and (e) retrieving an ordered list of results. After the processing task is completed, the process may output the results.

Figure 3:
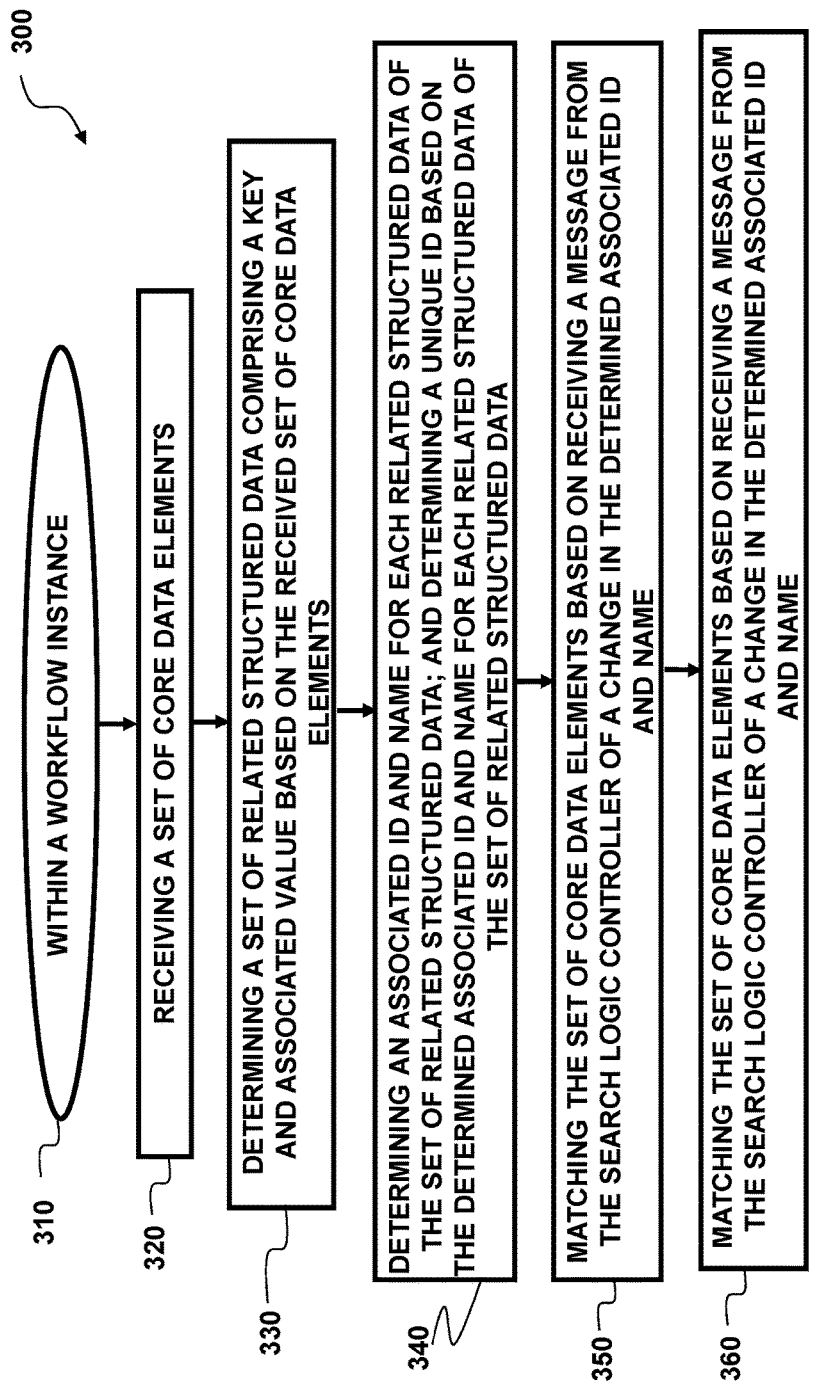
FIG. 3 is a top level flowchart of a process embodiment of the present invention within a workflow instance.

FIG. 3 is a top level flowchart of a process embodiment 300 of the dynamic collaborative workflow system within a workflow instance execution (310) that may comprise a computing device executing the steps of indexing, workflow, search/match, and on-demand categories of functions. The process flow may be embodiment as the following steps (and not necessarily in the order of): (a) receiving, by a computing device comprising: a processing unit and addressable memory, a set of core data elements (step 320); (b) determining, by an index controller of the computing device, a set of related structured data comprising a key and associated value based on the received set of core data elements (step 330); (c) determining, by a search logic controller of the computing device, an associated ID and name for each related structured data of the set of related structured data; and determining a unique ID based on the determined associated ID and name for each related structured data of the set of related structured data (step 340); (d) matching, by the match controller of the computing device, the set of core data elements based on receiving a message from the search logic controller of a change in the determined associated ID and name; and (e) retrieving, by the ordered result determiner of the computing device in response to a received query, an ordered list of results based on at least one of: the matched ID, the matched name, and the matched ID and name.

Figure 4:
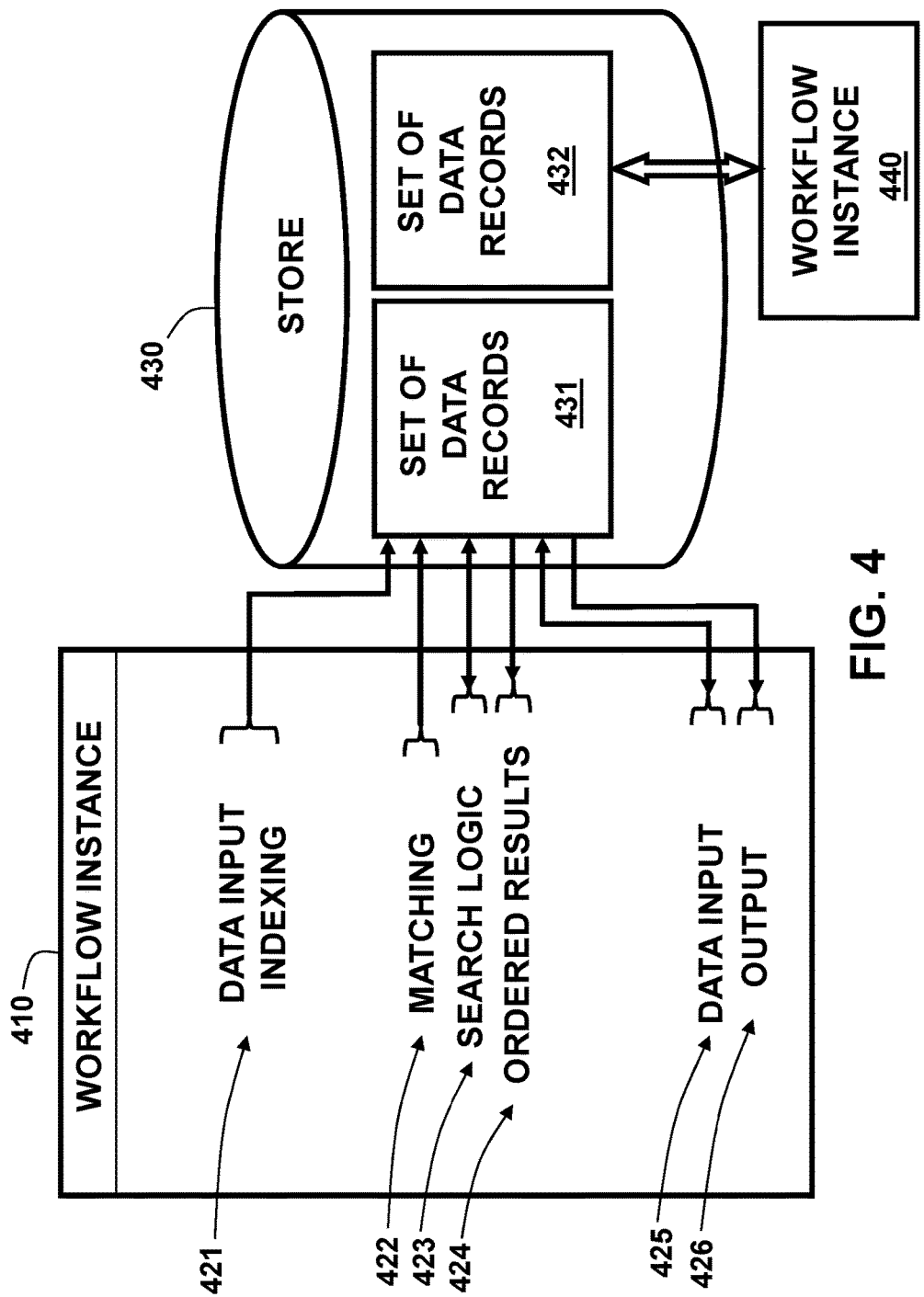
FIG. 4 is an exemplary functional block diagram of a workflow instance comprising activities.

FIG. 4 is an exemplary functional block diagram of a workflow instance 410 comprising activities. Generally, a workflow instance may comprise one or more activities or stages. In one embodiment, the workflow is initiated by data input 421 that in turn may provide an input to a data store 430, particularly a set of data records 431 for the workflow instance 410. Once data input has been determined, a matching controller may then match 422 the data, as shown as an input activity that provides an input to the set of data records 431 of the data store 430. Upon the matching of the records, a search logic 423 is implemented as a process activity that provides indexing of the set of data records 431 of the data store 430. An ordered result 424 may then be determined based on the matching controller and search logic implementation of the set of data records 431 of the data store 430. Another data input 425 may be subsequent to the previous steps and is shown as a process activity that provides an input to, and receives a stored output from, the set of data records 431 of the data store 430. The output controller may then output 426 requested data as is shown as an output activity that receives a stored output from the set of data records 431 of the data store 430. Accordingly, a separate workflow instance 440 may send or receive data from its own set of data records 432 of the data store 430 and/or a separate data store (not shown).

Figure 5:
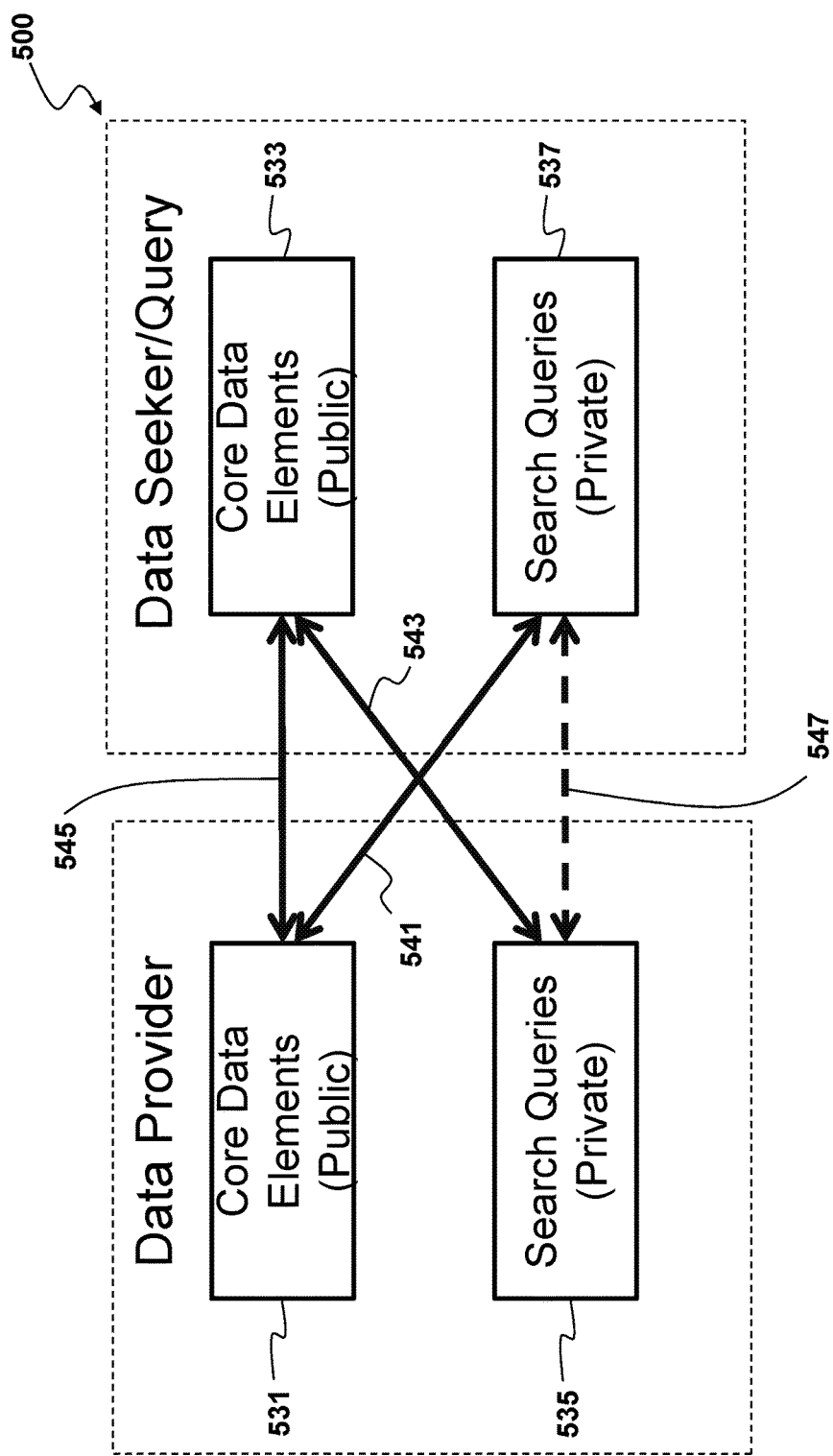
FIG. 5 is an exemplary functional block diagram of a workflow process for a data provider and data seeker.

FIG. 5 is an exemplary functional block diagram of a workflow process for a data provider and data seeker 500. A data provider may be one who inserts or provides core data elements to the dynamic collaborative workflow system environment via, for example, a user interface. In one embodiment, core data elements 531,533 being provided to the system may be public, i.e., publically available through search queries 535,537. The workflow as depicted by the diagram shows eight exemplary search/match pathways—indicated by 4 bidirectional arrows—that are enabled simultaneously, each working independently of the others. That is, the system via performing the indexing, workflow, search logic, and on-demand matching as disclosed herein, may allow for efficient, i.e., fast and accurate, management of continuously changing data sets in all 4 categories or workflow instances. A set of available search/match pathways 541,543,545 may be accessible to users as the core data elements 531,533 at each of the stages of the workflow are dynamically updated and synchronized during execution time, eliminating the need for any preprocess data binding. Accordingly, the disclosed methods, devices, and systems provide a process by which establishing a connection between two different data objects, e.g., core data elements 531,533 may be dynamically created. As further depicted, a relationship 547 between a set of private search queries 535,537 may be established upon the execution of a search logic controller and a match controller, in order to dynamically determine an ordered set of results that may be matching.

FIG. 6 illustrates an exemplary top level functional block diagram of a computing device embodiment 600. The exemplary operating environment is shown as a computing device 620 comprising a processor 624, such as a central processing unit (CPU), addressable memory 627, an external device interface 626, e.g., an optional universal serial bus port and related processing, and/or a Communication or Network Communication port and related processing, and an optional user interface 629, e.g., an array of status lights and one or more toggle switches, and/or a display, and/or a keyboard and/or a pointer-mouse system and/or a touch screen. Optionally, the addressable memory may, for example, be: flash memory, EPROM, and/or a disk drive or other hard drive. These elements may be in communication with one another via a data bus 628, and via an operating system 625 such as one supporting a web browser 623 and applications 622, the processor 624 may be configured to execute steps of a dynamic collaborative workflow system process for determining sets of related structured data and associated ID and name for each related structured data for dynamically creating data binding.

One of ordinary skill in the art will also appreciate that the elements, modules, and functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A computing device comprising:
a hardware processor, addressable memory; the addressable memory coupled to the processor, and wherein the processor executes instructions which cause the processor to execute the steps of:
execute workflow instances of management of continuously changing data and queries based on receiving a set of core data elements;
determine, by an index controller of the computing device, a set of related structured data comprising a key and associated value based on the received set of core data elements;
determine, by a search logic controller of the computing device, an associated ID and name for each related structured data of the set of related structured data;
determine, by the search logic controller of the computing device, a unique ID based on the determined associated ID and name for each related structured data of the set of related structured data, wherein the unique ID is stored in the addressable memory thereby expediting lookup operations and eliminating any preprocess data binding to establish a connection between the received set of core data elements within the workflow instances being executed;
match, by a match controller of the computing device, the set of core data elements with the determined unique ID based on receiving a message from the search logic controller of an update to the unique ID for the determined associated ID and name, wherein the matching is based on a synchronization of the set of core data elements with the determined unique ID during execution time; and
retrieve, by an ordered result determiner of the computing device in response to a received query, an ordered list of results based on at least one of: a matched ID, a matched name, and a matched ID and name, wherein at each of the stages of the workflow the ordered list of results is dynamically updated and synchronized during execution time, thereby eliminating the need for any preprocess data binding.

2. The device of claim 1, wherein the unique ID is further determined based on a combination of the associated ID and name.

3. The device of claim 1 further configured to:
output, by an output controller of the computing device, the determined ordered list of results.

4. The device of claim 1 further configured to:
correct any query errors in the determined ordered list of results, based on checking the unique ID against the associated ID and name.

5. The device of claim 1 further configured to:
modify, by the search logic controller of the computing device, the set of core data elements based on receiving a message from at least one of: index controller and the match controller, the message comprising information about a change in the determined associated ID and name.

6. The device of claim 1, wherein all of or at least a portion of the set of core data elements is stored on a second computing device having a processor and memory, wherein the two computing devices are in communication with each other via a network link.

7. The device of claim 1, wherein the determined unique ID is stored in the addressable memory.

8. The device of claim 7, wherein the computing device further comprises a data store.

9. The device of claim 8, wherein the associated ID is stored in the addressable memory and the name is stored in the data store.

10. The device of claim 1, wherein the index controller, the search logic controller, the match controller, and the ordered result determiner are executed independently and simultaneously via parallel processing by the computing device.

11. A method comprising:
receiving, by a computing device comprising: a hardware processor, addressable memory, the addressable memory coupled to the processor, a set of core data elements;
determining, by an index controller of the computing device, a set of related structured data comprising a key and associated value based on the received set of core data elements;
determining, by a search logic controller of the computing device, an associated ID and name for each related structured data of the set of related structured data;
determining, by the search logic controller of the computing device, a unique ID based on the determined associated ID and name for each related structured data of the set of related structured data, wherein the unique ID is stored in the addressable memory thereby expediting lookup operations and eliminating any preprocess data binding to establish a connection between the received set of core data elements within the workflow instances being executed;
matching, by a match controller of the computing device, the set of core data elements with the determined unique ID based on receiving a message from the search logic controller of an update to the unique ID for the determined associated ID and name, wherein the matching is based on a synchronization of the set of core data elements with the determined unique ID during execution time; and
retrieving, by an ordered result determiner of the computing device in response to a received query, an ordered list of results based on at least one of: the matched ID, the matched name, and the matched ID and name, wherein at each of the stages of the workflow the ordered list of results is dynamically updated and synchronized during execution time, thereby eliminating the need for any preprocess data binding.

12. The method of claim 11, wherein the unique ID is further determined based on a combination of the associated ID and name.

13. The method of claim 11 further comprising:
outputting, by an output controller of the computing device, the determined ordered list of results.

14. The method of claim 11 further comprising:
correcting, by the computing device, any query errors in the determined ordered list of results, based on checking the unique ID against the associated ID and name.

15. The method of claim 11 further comprising:
modifying, by the search logic controller of the computing device, the set of core data elements based on receiving a message from at least one of: index controller and the match controller, the message comprising information about a change in the determined associated ID and name.

16. The method of claim 11, wherein all of or at least a portion of the set of core data elements is stored on a second computing device having a processor and memory, wherein the two computing devices are in communication with each other via a network link.

17. The method of claim 11, wherein the determined unique ID is stored in the addressable memory.

18. The method of claim 17, wherein the computing device further comprises a data store.

19. The method of claim 18, wherein the associated ID is stored in the addressable memory and the name is stored in the data store.

20. The method of claim 11, wherein the index controller, the search logic controller, the match controller, and the ordered result determiner are executed independently and simultaneously via parallel processing by the computing device.

* * * * *